(12) United States Patent
Kim (10) Patent No.: US 8,399,125 B2
(45) Date of Patent: Mar. 19, 2013

(54) CAP ASSEMBLY AND SECONDARY BATTERY USING THE SAME

(75) Inventor: Dae-Kyu Kim, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 722 days.

(21) Appl. No.: 12/207,836

(22) Filed: Sep. 10, 2008

(65) Prior Publication Data

US 2009/0123831 A1 May 14, 2009

(30) Foreign Application Priority Data

Nov. 8, 2007 (KR) .......................... 10-2007-113805

(51) Int. Cl.
- *H01M 2/04* (2006.01)
- *H01M 2/06* (2006.01)
- *H01M 2/10* (2006.01)

(52) U.S. Cl. .......................... 429/175; 429/163; 429/186

(58) Field of Classification Search .................. 429/163, 429/200, 326, 329, 62, 174, 175, 186
See application file for complete search history.

(56) References Cited

U.S. PATENT DOCUMENTS

| | | | |
|---|---|---|---|
| 5,876,868 A | 3/1999 | Tanida | |
| 2003/0003370 A1* | 1/2003 | Arai et al. | 429/326 |
| 2005/0266302 A1* | 12/2005 | Kim | 429/62 |
| 2006/0046154 A1* | 3/2006 | Webber et al. | 429/329 |
| 2006/0115725 A1* | 6/2006 | Kim | 429/174 |
| 2007/0042267 A1* | 2/2007 | Kim et al. | 429/200 |

FOREIGN PATENT DOCUMENTS

| | | |
|---|---|---|
| JP | 11-154501 | 6/1999 |
| JP | 2001126695 A * | 5/2001 |
| JP | 2001-229905 | 8/2001 |
| JP | 2005-123060 | 5/2005 |
| JP | 2006-12604 | 1/2006 |
| JP | 2007-157609 | 6/2007 |
| KR | 2000-0051448 | 8/2000 |
| KR | 2001-0076250 | 8/2001 |
| KR | 10-358224 | 10/2002 |
| KR | 10-2004-0107926 | 12/2004 |
| KR | 10-2004-0110332 | 12/2004 |
| KR | 10-646530 | 11/2006 |

OTHER PUBLICATIONS

Machine translation of: JP 2001-126695A, Masuko, May 2001.*
Machine translation of: KR 2004-0110332, Yoon, Dec. 2004.*
Machine translation of: KR 2000-0051448, Sang, Aug. 2000.*
Korean Patent Registration Gazette issued in corresponding Korean Patent Application No. 10-2007-0113805.
Abstract of Korean Publication No. 2001-11900 published on Feb. 15, 2001.

(Continued)

*Primary Examiner* — Basia Ridley
*Assistant Examiner* — Kenneth Douyette
(74) *Attorney, Agent, or Firm* — Knobbe Martens Olson & Bear LLP (57) ABSTRACT

A cap assembly and a secondary battery using the cap assembly, the cap assembly including: a cap-up having a groove; a PTC thermistor disposed in the groove; and inner components disposed below the cap-up. The inner components can include a vent disposed under the cap-up; a cap-down disposed under the vent; a sub-plate disposed under the cap-down; and an insulating vent disposed between the vent and the cap-down The secondary battery includes: an electrode assembly; a can containing the electrode assembly, having an opening at one side; and the cap assembly to seal the opening of the can.

21 Claims, 5 Drawing Sheets

OTHER PUBLICATIONS

Abstract of Korean Publication No. 2006-112728 A published on Nov. 2, 2006.

Korean Office Action issued on Sep. 21, 2009 in corresponding Korean Patent Application No. 10-2007-0113805.

* cited by examiner

CAP ASSEMBLY AND SECONDARY BATTERY USING THE SAME

CROSS-REFERENCE TO RELATED APPLICATIONS

This application claims the benefit of Korean Patent Application No. 2007-113805, filed Nov. 8, 2007, the disclosure of which is hereby incorporated herein by reference in its entirety.

BACKGROUND OF THE INVENTION

1. Field of the Invention

Aspects of the present invention relate to a cap assembly, and a secondary battery using the cap assembly, to prevent an increase of internal resistance, and to increase the capacity of the secondary battery, per unit area.

2. Description of the Related Art

Recently, as portable electronic devices, such as, cellular phones, notebook computers camcorders, etc. have been widely distributed, the secondary battery has actively been developed for use as a power source of these electronic devices.

Secondary batteries can be classified as Nickel-Cadmium (Ni—Cd), Plumbum (Pb), Nickel-Hydrogen (N—H), Lithium ion, Lithium Polymer, and so on. Lithium secondary batteries have been widely used in electronic devices, because such batteries can be compact, and can have a large capacity, a high operating voltage, and a high energy density per unit weight.

Lithium secondary batteries can be divided into a can-type and a pouch-type, according to the shape of a casing containing an electrode assembly. The can-type batteries can be prismatic or cylindrical.

A cylindrical secondary battery comprises: an electrode assembly; a can to house the electrode assembly; and a cap assembly including an insulating gasket, to seal an opening of the can. The electrode assembly includes a positive electrode plate, a negative electrode plate, and a separator. An electrolyte is also contained within the can.

The cap assembly may be formed by sequentially stacking a cap-up, a current interrupt device, a positive temperature coefficient (PTC) thermistor, and an electrode terminal, in the opening of the can. The cap assembly may be formed by combining the cap-up, with other elements as a unit, and then sealing the opening of the can with the cap assembly.

Recently, an integrated configuration of the electrode assembly has been proposed, in order to simplify manufacturing, and to reduce any contact resistance of the components. Caulking and welding methods have been widely used to form the integrated configuration. With the welding method, however, it is very difficult to form an integrated configuration including a cap-up, since the PTC thermistor, whose characteristics are changeable by heat, is disposed between the cap-up and the current interrupt device.

SUMMARY OF THE INVENTION

Aspects of the present invention provide a cap assembly comprising a cap-up, a PTC thermistor, and inner components disposed below the cap-up. A groove is formed at one side of the cap-up, and the PTC thermistor is inserted into the groove.

Aspects of the present invention provide a secondary battery comprising an electrode assembly, a can containing the electrode assembly and having an opening, and a cap assembly to seal the can. The cap assembly comprises a cap-up having a groove at one side, a PTC thermistor, and inner components disposed under the cap-up. The PTC thermistor is inserted into the groove.

According to aspects of the present invention, the groove may be formed in a bottom surface of the cap-up. The PTC thermistor may be completely inserted into the groove. The PTC thermistor may also be partially inserted into the groove. The inner components may comprise a Current Interrupt Device (CID) disposed below the cap-up, and a vent disposed below the CID.

According to aspects of the present invention, the inner components may comprise a vent disposed below the cap-up, a cap-down disposed below the vent, a sub-plate disposed below the cap-down, and an insulating vent disposed between the vent and the cap-down.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the exemplary embodiments of the present invention, examples of which are illustrated in the accompanying drawings, wherein like reference numerals refer to the like elements throughout. The exemplary embodiments are described below, in order to explain the present invention by referring to the figures. The thickness and length of layers and regions may be exaggerated for convenience. As referred to herein, when a first element is said to be "disposed" on, or adjacent to, a second element, the first element can directly contact the second element, or can be separated from the second element by one or more other elements can be located therebetween.

As referred to herein, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Figure 1:
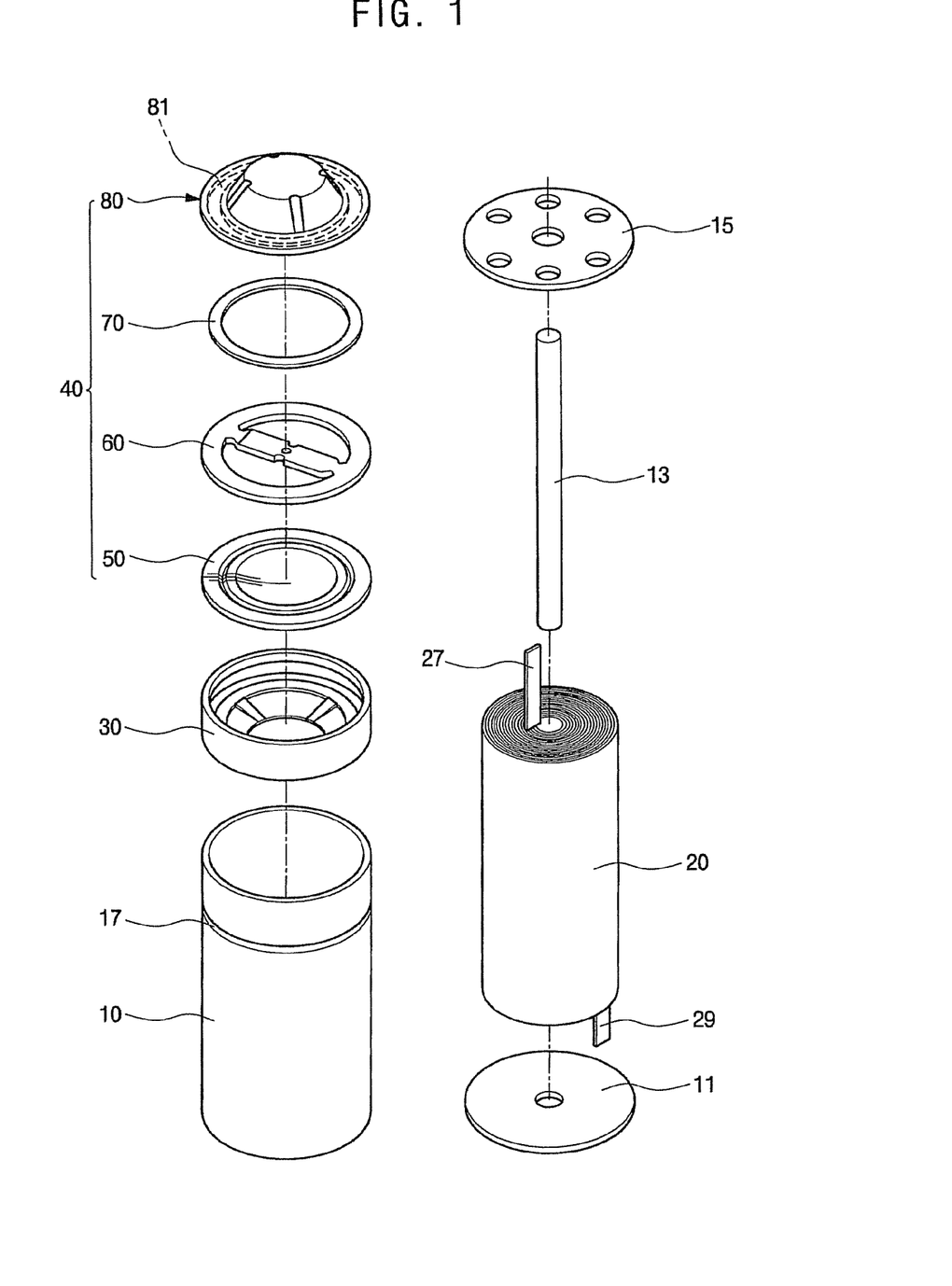
FIG. 1 is an exploded perspective view illustrating a configuration of a secondary battery, according to a first exemplary embodiment of the present invention.
Figure 2A:
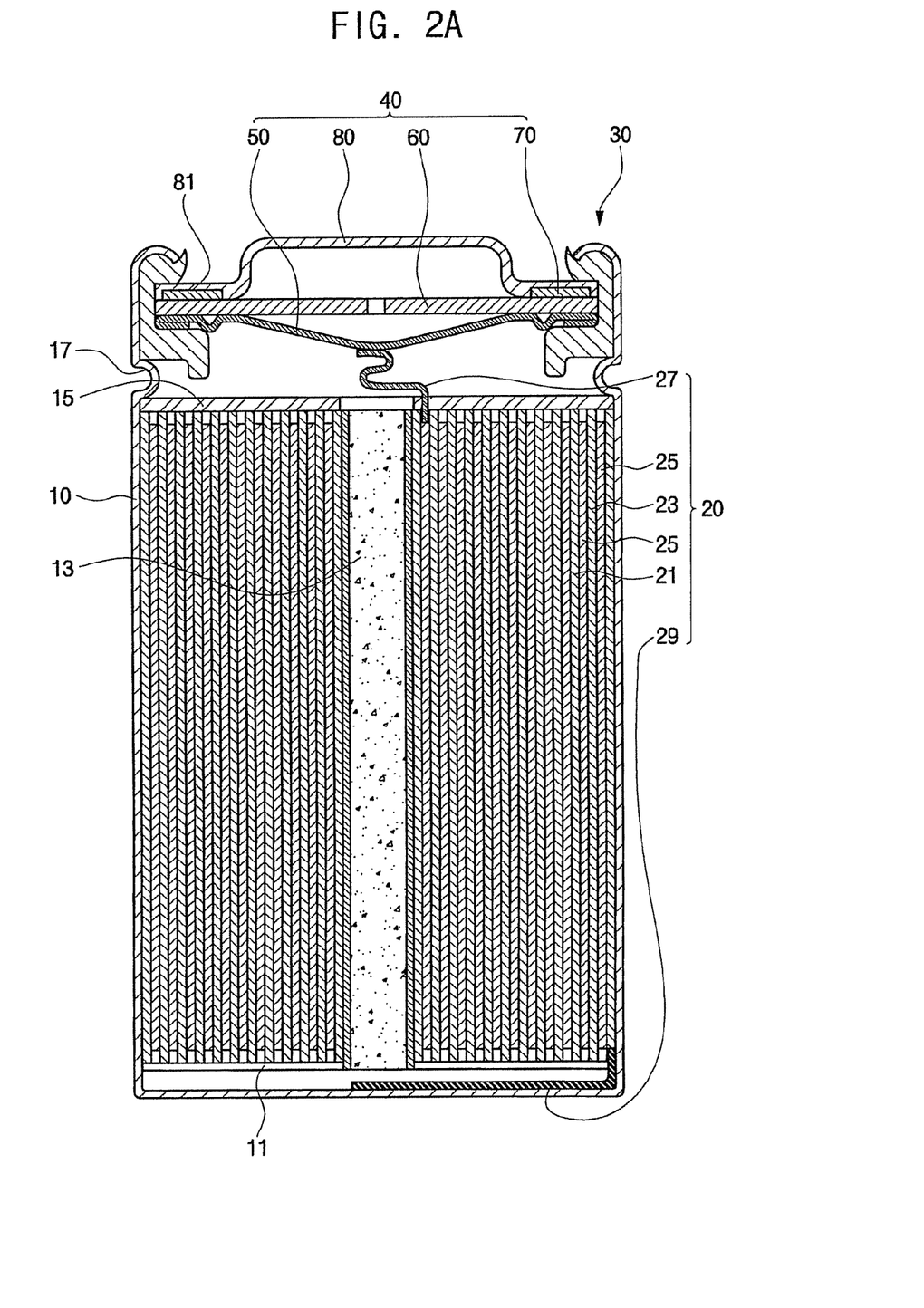
FIGS. 2A and 2B are combined sectional views illustrating the secondary battery of FIG. 1, and a modification thereof.
Figure 2B:
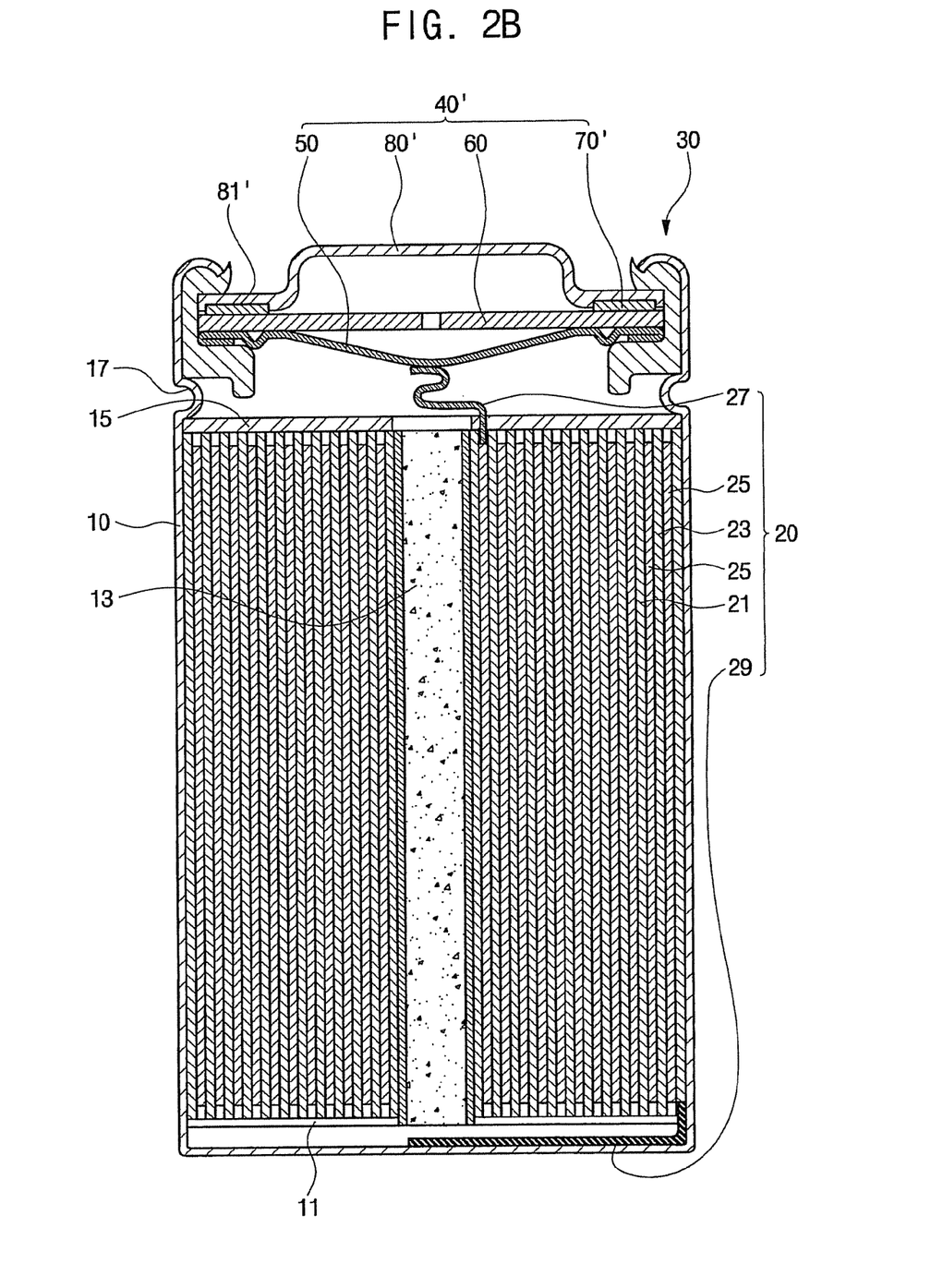

FIG. 1 is an exploded perspective view illustrating a configuration of a secondary battery, according to a first exemplary embodiment of the present invention. FIGS. 2A and 2B are combined sectional views illustrating the secondary battery of FIG. 1 and a modified version thereof. Referring to FIGS. 1 through 2B, a jelly-roll type electrode assembly 20 may be formed, by winding two rectangular electrode plates 21 and 23 together.

Separators 25 may be disposed between the two electrode plates 21 and 23. Accordingly, the separators 25 may be disposed to prevent a short circuit between the two electrode plates 21 and 23.

The two electrode plates 21 and 23 may be formed by coating slurries of positive and negative electrode active materials, into a collector made of one of metal foil and a metal mesh of aluminum or copper, respectively. The slurries may be formed by combining a granular active material, an auxiliary conductor, a binder, and a plasticizer, with a solvent. The solvent is removed in a subsequent electrode-forming process.

Non-coating portions, in which slurries are not coated, may be formed at end portions of the collectors. Electrode tabs 27 and 29 may attached to the non-coating portions. The electrode tab 27 may upwardly protrude toward the opening portion of the can 10. The electrode tab 28 may extend toward the bottom surface of the can 10. A plurality of electrode tabs may be attached to an electrode plate.

The can 10 may be implemented in various shapes, including prismatic shapes, cylindrical shapes, and the like. The can 10 may be formed by a deep drawing method. The can 10 be formed of steel, an aluminum alloy, and the like.

If the can 10 is cylindrical, the can has a rounded side surface, a circular bottom surface, and an opening opposite to the bottom surface. The electrode assembly 20 may be inserted into the can 10, through the opening. Before inserting the electrode assembly 20, a inner insulating plate 11 be positioned to cover a bottom surface of the electrode assembly 20, and the second electrode tab 29 may be bent, to be parallel with the bottom surface of the can 10.

The electrode assembly 20 may be formed as a jelly-roll, and may be have a hollow center. A hole may be formed in the inner insulating plate 11, which corresponds to the hollow center. A portion of the second electrode tab 29 may extend across the hole of the inner insulating plate 11.

A welding rod may be inserted through the hollow center of the electrode assembly 20, from above. Then, the second electrode tab 29 may be welded to the bottom surface of the can 10. Accordingly, the can 10 may have the same polarity as the second electrode tab 29, so that the can 10 may act as an electrode terminal.

According to exemplary embodiments of the present invention, the can 10 may comprise a center-pin 13 that is inserted in the hollow center of the electrode assembly 20. The center-pin 13 may prevent a deformation of the electrode assembly 20, provide a gas passage for the release of gas resulting from a malfunction of the electrode assembly 20, and extend the life-time of the battery.

After welding the second electrode tab 29, an upper insulating plate 15 may be disposed over the electrode assembly 20. The first electrode tab 27 may protrude against the electrode assembly 20, through holes of the upper insulating plate 15. In the case that the upper insulating plate 15 has a hole in the center, the second electrode tab 29 may be welded after the installation of the upper insulating plate 15. A bead 17 may be formed on an upper portion of the can 10, by crimping a sidewall of the can 10, to match a top level of the upper insulating plate. The bead 17 may provide highly reliable electrical connection, by preventing the electrode assembly from fluctuating in the can 10.

An electrolyte may be injected into the can 10, onto the electrode assembly. The injection of electrolyte may be carried out before forming the bead 17. An insulating gasket 30 may be inserted into the opening of the can 10, and a cap assembly 40 may be combined with the insulating gasket 30, to seal the can 10. The insulating gasket 30 may be an elastic material having good insulative properties. The insulating gasket 30 may completely wrap around an outer circumference of the cap assembly 40, and may seal the can 10, as well as insulate the cap assembly 40 from the can 10.

The cap assembly 40 and the insulating gasket 30 may be installed on the can 10, as a unit. Otherwise, the components may be stacked into the insulating gasket 30, sequentially. The cap assembly 40, according to a first exemplary embodiment of the present invention, may comprise a cap-up 80, PTC thermistor 70, and inner components disposed under the cap-up. The inner components may comprise a vent 50 electrically connected to the first electrode tab 27, and a current interrupt device (CID) 60 to interrupt a current path, according to the operation of the vent 50.

The cap assembly 40 may have a stacked configuration, with the CID 60 disposed below the cap-up 80, which has a groove 81 on one side, and the vent 50 disposed below the CID 60. The PTC thermistor 70 may be inserted into the groove 81, which is formed opposite to the CID 60, on the bottom surface of the cap-up 80. The PTC thermistor 70 may be completely inserted into the groove, as illustrated in FIG. 2A.

Accordingly, it may be possible to integrate the cap-up 80 and the CID 60 through welding, since the cap-up 80 is in direct contact with the CID 60, due to the PTC thermistor 70 into the cap-up 80. Since the PTC thermistor 70 is inserted into the groove 81 of the cap-up 80, an increase of internal resistance, due to contact among components, may be prevented. The contact among the components may result from the movement of the components. Further, aspects of the present embodiment may increase the capacity of a cell, by reducing a space that the PTC thermistor 70 occupies.

As illustrated in FIG. 2B, a portion of a PTC thermistor 70' may be inserted into a groove 81'. This exemplary embodiment may have a small constraint in reducing space, due to an increased interval between a cap-up 80' and a CID 60, as compared with the previous embodiment, in which the PTC thermistor 70 is completely inserted into the groove 81. It may, however, have better characteristics in controlling current flow.

The exemplary embodiment may further comprise an insulating unit, having a thickness corresponding to a portion of the PTC thermistor 70' that is not inserted into the groove 81', between the CID 60 and the cap-up 80'. The vent 50 may interrupt the current flow through the CID 60, if an internal pressure exceeds a certain level, due to gas produced by the electrode assembly, and may exhaust the gas from the electrode assembly. A crimping process may be carried out, by pressing downward along an inner wall of the can 10 to form the bead 17, after the cap assembly 40 is installed on the insulating gasket 30.

Figure 3A:
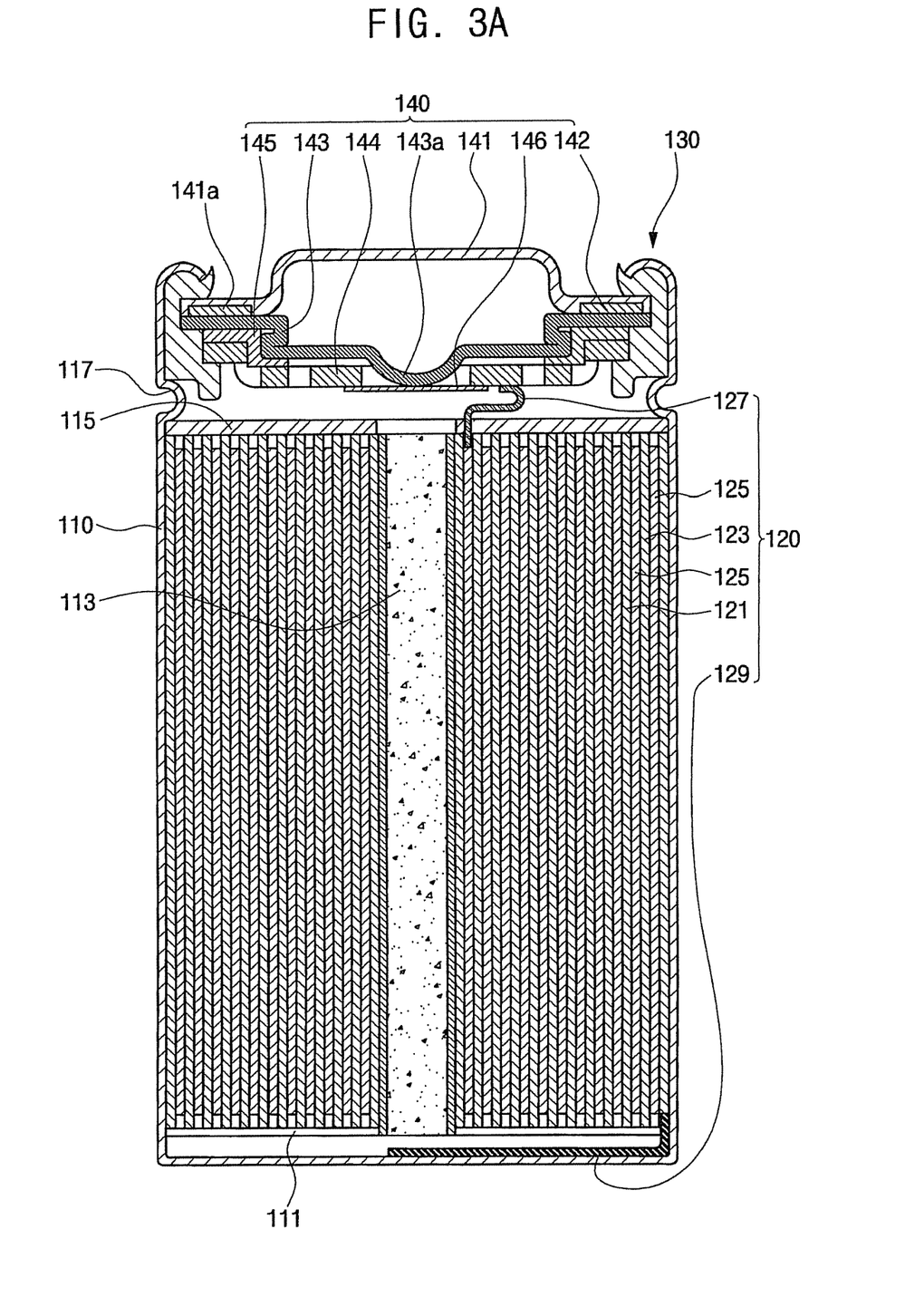
FIGS. 3A and 3B are sectional views illustrating a configuration of a secondary battery, according to an exemplary embodiment of the present invention, and a modification thereof.
Figure 3B:
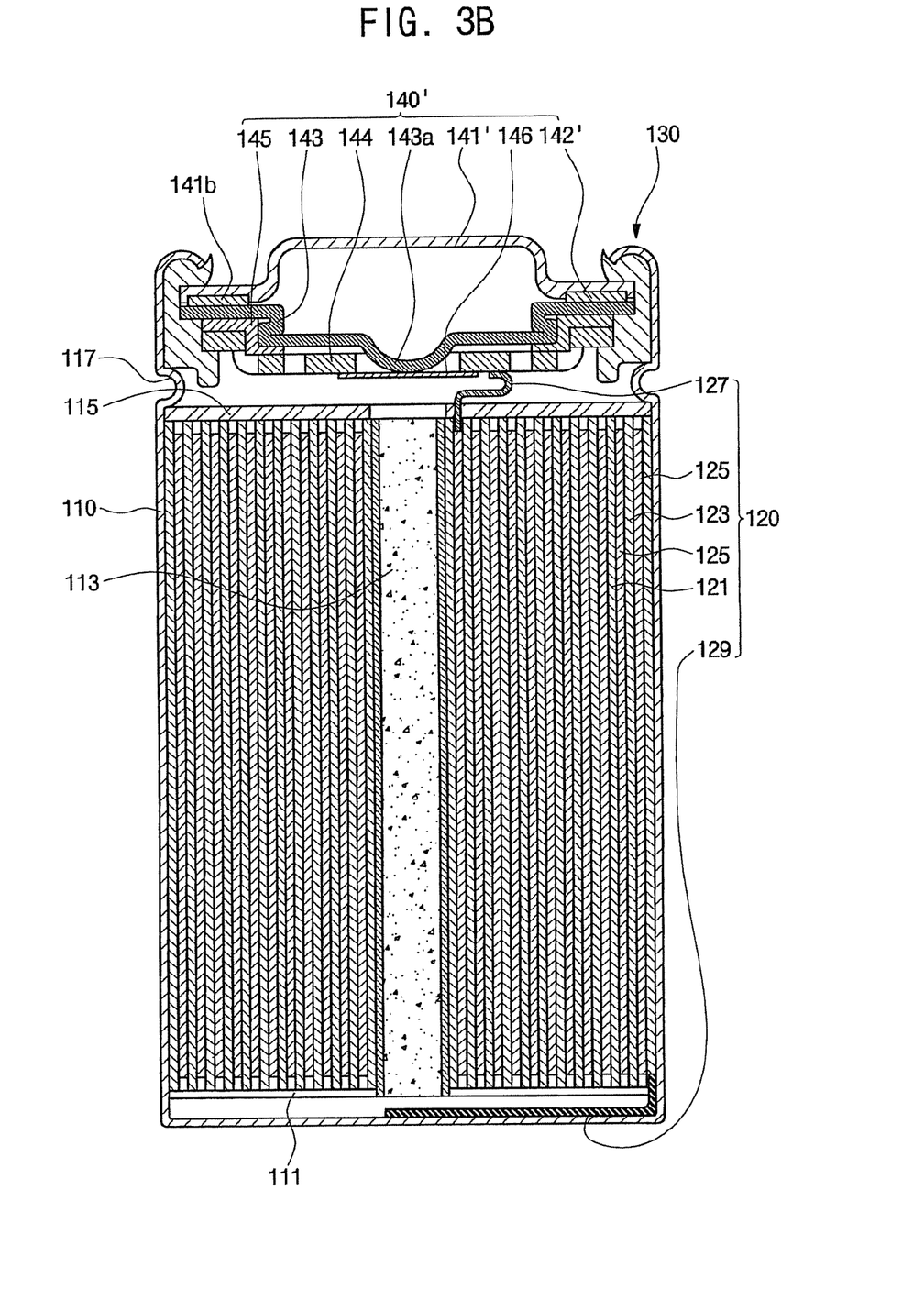

FIGS. 3A and 3B are sectional views illustrating a configuration of a secondary battery, according to another exemplary embodiment of the present invention. Referring to FIGS. 3A and 3B, a secondary battery may include: an electrode assembly 120 contained within a can 110, an insulating gasket 130 inserted into an opening of the can 110; and a cap assembly 140 combined with the insulating gasket 130. Elements 110 through 130, of the secondary battery illustrated in FIGS. 3A and 3B, are identical to elements 10 through 30 of the secondary battery illustrated in FIGS. 1 through 2B. Accordingly, a detailed description thereof will be omitted.

The cap assembly 140 may comprise: a cap-up 141 having a groove 141a formed in one side; a PTC thermistor 142 inserted into the groove 141a; and inner components disposed below the cap-up 141. The inner components may comprise a vent 143 having a downward protruding portion 143a, a cap-down 144 disposed below the vent 143, and a sub-plate 146 disposed below the cap-down 144.

According to some embodiments, the PTC thermistor 142 may be completely inserted into the groove 141a, as illustrated in FIG. 3A. Accordingly, it may be possible to integrate the cap-up 141 and the vent 143, through welding, since the cap-up 141 is in direct contact with the vent 143, due to the insertion of the PTC thermistor 142 into the cap-up 141.

The present embodiment may prevent an increase of internal resistance, due to contact among the components. The contact among the components may happen through the movement of the components. The present embodiment may increase the capacity of a cell, by reducing a space the PTC thermistor 142 occupies.

As illustrated in FIG. 3B, a portion of a PTC thermistor 142' may be inserted into a groove 141b. This exemplary embodiment may have a small constraint in reducing space, due to an increased interval between a cap-up 141' and a vent 143, as compared with the previous embodiment, in which the PTC thermistor 142 is completely inserted into the groove 141a. It may, however, have better characteristics in controlling current flow.

The present embodiment may further comprise an insulating unit 145, having a thickness corresponding to a portion of the PTC thermistor 142' that is not inserted into the groove 141b, between the vent 143 and the cap-up 141'. The insulating unit 145 may be interposed between the cap-down 144 and the vent 143.

A sub-plate 146 may be disposed across a center hole formed in the cap-down 144, below the cap-down 144, and may be connected to a protruding portion 143a of the vent 143, which is exposed through the center hole. An electrode tab 127 protruding against the electrode assembly 120 may be connected to either the cap-down 144, or the sub-plate 146.

The bottom surface of the protruding portion 143a of the vent 143 may be configured to cut off an electrical connection with the sub-plate 146, by raising or lowering the protruding portion 143a, in response to changes in the internal pressure of the battery. The cap-down 144 may be electrically connected to the sub-plate 146, by laser welding. The protruding portion 143a of the vent 143 may be electrically connected to the sub-plate 146, by ultrasonic welding, etc. A crimping process may be carried out by pressing an inner wall of the can 110 to form a bead 117, after the cap assembly 140 is combined with the opening portion of the can 110.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. A cap assembly comprising:
   a cap-up having a central portion, a peripheral portion around the central portion, and a groove in an inner surface of the peripheral portion, the groove extending along substantially an entire circumference of the cap-up;
   a PTC thermistor seated in the groove, such that the PTC thermistor extends along substantially the entire circumference of the cap-up; and
   inner components disposed below the cap-up.

2. The cap assembly of claim 1, wherein the groove and the inner surface face the inner components.

3. The cap assembly of claim 1, wherein the PTC thermistor is completely inserted into the groove.

4. The cap assembly of claim 1, wherein the PTC thermistor is partially inserted into the groove.

5. The cap assembly of claim 1, wherein the inner components comprise:
   a current interrupt device (CID) disposed below the cap-up; and
   a vent disposed below the CID.

6. The cap assembly of claim 5, wherein the CID contacts the inner surface of the cap-up.

7. The cap assembly of claim 5, wherein the CID is welded to the inner surface of the cap-up.

8. The cap assembly of claim 1, wherein the inner components comprise:
   a vent disposed under the cap-up;
   a cap-down disposed under the vent;
   a sub-plate disposed under the cap-down; and
   an insulating vent disposed between the vent and the cap-down.

9. The cap assembly of claim 8, wherein the vent contacts the inner surface of the cap-up.

10. The cap assembly of claim 8, wherein the vent is welded to the inner surface of the cap-up.

11. A secondary battery comprising:
    an electrode assembly;
    a can to house the electrode assembly, having an opening at one side; and
    a cap assembly to seal the opening of the can, the cap assembly comprising,
       a cap-up having a central portion, a peripheral portion around the central portion, and a groove in an inner surface of the peripheral portion, the groove extending along substantially an entire circumference of the cap-up,
       a PTC thermistor seated in the groove, such that the PTC thermistor extends along substantially the entire circumference of the cap-up, and
       inner components disposed under the cap-up.

12. The secondary battery of claim 11, wherein the electrode assembly comprises:
    a first electrode plate;
    a first electrode tab connected to the first electrode plate and the cap assembly;
    a second electrode plate;
    a second electrode tab connected to the second electrode plate and the can; and
    a separator interposed between the first electrode plate and the second electrode plate.

13. The secondary battery of claim 11, wherein the inner surface and the groove face the inner components.

14. The secondary battery of claim 11, wherein the PTC thermistor is completely inserted into the groove.

15. The secondary battery of claim 11, wherein PTC thermistor is partially inserted into the groove.

16. The secondary battery of claim 11, wherein the inner components comprise:
    a current interrupt device (CID) disposed below the cap-up; and
    a vent disposed below the CID.

17. The secondary battery of claim 16, wherein the CID contacts the inner surface of the cap-up.

18. The secondary battery of claim 17, wherein the CID is welded to the inner surface of the cap-up.

19. The secondary battery of claim 11, wherein the inner components comprise:
- a vent disposed under the cap-up;
- a cap-down disposed under the vent;
- a sub-plate disposed under the cap-down; and
- an insulating vent disposed between the vent and the cap-down.

20. The secondary battery of claim 19, wherein the vent contacts the inner surface of the cap-up.

21. The secondary battery of claim 20, wherein the vent is welded to the inner surface of the cap-up.

* * * * *